United States Patent
Kim et al.

(10) Patent No.: US 9,569,007 B2
(45) Date of Patent: Feb. 14, 2017

(54) TOUCH PAD USING PIEZO EFFECT

(71) Applicant: WUJUNGHIGHTECH Co., Ltd., Seongnam-si, Gyeonggi-do (KR)

(72) Inventors: Soo Ho Kim, Yongin-si (KR); Sung Uk Hong, Seongnam-si (KR)

(73) Assignee: WUJUNGHIGHTECH CO., LTD., Seongnam-si, Gyeonggi-do (KR)

( * ) Notice: Subject to any disclaimer, the term of this patent is extended or adjusted under 35 U.S.C. 154(b) by 0 days.

(21) Appl. No.: 14/810,570

(22) Filed: Jul. 28, 2015

(65) Prior Publication Data

US 2016/0178461 A1 Jun. 23, 2016

(30) Foreign Application Priority Data

Dec. 19, 2014 (KR) .................. 10-2014-0184304
Apr. 6, 2015 (KR) .................. 10-2015-0048240
Apr. 6, 2015 (KR) .................. 10-2015-0048242
Apr. 24, 2015 (KR) .................. 10-2015-0057797
May 13, 2015 (KR) .................. 10-2015-0066535

(51) Int. Cl.
*G06F 3/02* (2006.01)
*G06F 3/041* (2006.01)

(52) U.S. Cl.
CPC ............. *G06F 3/0202* (2013.01); *G06F 3/041* (2013.01)

(58) Field of Classification Search
CPC ............................. G06F 3/0202; G06F 3/041
See application file for complete search history.

(56) References Cited

U.S. PATENT DOCUMENTS

| 5,673,041 A | 9/1997 | Chatigny et al. |
| 2013/0201131 A1* | 8/2013 | Choi .................... G06F 3/0488 345/173 |
| 2015/0292963 A1* | 10/2015 | Kawamura .............. G01L 1/16 345/174 |
| 2015/0346881 A1 | 12/2015 | Watazu |

FOREIGN PATENT DOCUMENTS

| JP | 2014-134452 A | 7/2014 |
| KR | 10-2012-0009677 A | 2/2012 |
| KR | 10-2013-0103254 A | 9/2013 |
| KR | 10-2014-0123508 A | 10/2014 |

OTHER PUBLICATIONS

Mar. 4, 2016, Korean Office Action for related KR application No. 10-2014-0184304.
Apr. 15, 2016, Korean Office Action for related KR application No. 10-2015-0066535.

* cited by examiner

*Primary Examiner* — Fred Tzeng
(74) *Attorney, Agent, or Firm* — Paratus Law Group, PLLC

(57) ABSTRACT

Disclosed is a touch pad using the piezo effect, including a touch pad equipped with touch keys; a piezo film that attaches to the bottom surface of the touch pad and radiates ultrasonic waves; and a control section that recognizes touches a user executes by analyzing the electric displacement of the piezo film and ultrasonic impedance reflected by the touch pad surface and a touch object that contacts to the surface.

20 Claims, 4 Drawing Sheets

TOUCH PAD USING PIEZO EFFECT

CROSS REFERENCE TO PRIOR APPLICATION

This application claims priority to Korean Patent Application Nos. 10-2014-0184304 (filed on Dec. 19, 2014), 10-2015-0048240 (filed on Apr. 6, 2015), 10-2015-0048242 (filed on Apr. 6, 2015), 10-2015-0057797 (filed on Apr. 24, 2015), and 10-2015-0066535 (filed on May 13, 2015), which are all hereby incorporated by reference in their entirety.

BACKGROUND

The present invention relates to a touch pad and, more specifically, to a touch pad, based on piezoelectric effect, that employs a piezo film, is fabricated thin on, but not limited to, metal, exactly and stably recognizes various touch patterns a user executes such as long key, multi key, slide key, etc. and significantly improves the level of security.

Touch-sensitive switch technology that has been thus far developed includes a (reflective mode ultrasonic) touch-sensitive switch comprising: a substrate having a touch region thereon; a piezoelectric element that has electrodes; drive means that apply a drive signal to the electrodes; detection means that provide a detection signal derived from the drive signals; and discriminating means that provide an output signal. (Refer to U.S. Pat. No. 5,673,041)

Such a touch-sensitive switch has a first surface and a second surface that are opposed and parallel to each other, wherein the first surface has a substrate having a touch region; and a piezoelectric element having first and second generally planar and parallel opposed surfaces and an electrode on each of the piezoelectric element surfaces, wherein the piezoelectric element is secured, from the touch region, across the substrate, in parallel with the second surface of the substrate.

In addition, such a touch-sensitive switch has drive means that are coupled to the electrodes to apply a drive signal to the electrodes; detection means that are coupled to the electrodes to provide a detection signal derived from the drive signal; and discriminating means that are equipped for receiving the detection signal from the detection means in order to evaluate the detection signal and provide an output signal that indicates a finger touch to the touch region.

Based on such a configuration, a frequency-modulated drive signal is applied to the piezoelectric element that is mounted on the substrate opposed to the touch region, the piezoelectric element converts the signal to an amplitude-modulated signal and the amplitude-modulated signal is demodulated, wherein the amplitude of the demodulated signal varies according to whether a finger touches to the touch region.

Therefore, the touch region does not easily get damaged, the reliability of a touch increases to a certain extent and the sensibility of the sensor does not decrease to a large extent even if the force of a touch gradually increases. On the other hand, the severe disadvantage of ultrasonic touch-sensitive switches according to existing technology has still been maintained per se in that those switches are vulnerable to touch errors brought about by foreign substances such as water or ketchup.

Meanwhile, simple piezoelectric devices are vulnerable to external impacts or vibration. Piezoelectric devices especially for touch recognition may not produce an adequate amount of output if the plate, such as metal, that is equipped with touch keys is thick or the clearance between the touch keys is narrow, which fails to guarantee exact and stable touches of users.

In addition, those piezoelectric touch devices that utilize the piezo effect existing technology provides can neither be directly applied, without an additional process, to metal, advanced materials, etc. nor produce an appropriate value of the electric displacement of the piezoelectric devices when a touch object is slowly detouched even with a touch input on the metal plate, etc. that is equipped with touch keys.

Here, another drawback is derived in that the devices may not safely recognize such behaviors as long key input that maintains the state of a key input for a certain period, multi key input that simultaneously inputs multiple keys and wheel slide touch input that is, as a drag touch, the touch object is detouched after a short period.

Therefore, security keys users can specify such as password are very restricted in terms of their species and it is practically hard to expect a high degree of security because there is a limit to recognition of long key input and multi key input in applying a touch device using the piezo effect to a metal plate, etc.

Furthermore, those piezoelectric touch devices using the piezo effect of existing technology that employ ceramic piezoelectric elements cannot be fabricated considerably thin and are hard to be achieved in smartphones, etc.

SUMMARY

The present invention provides, in order to resolve the problems in existing technology, a touch pad using the piezo effect that exactly recognizes touches a user executes by, still utilizing a piezo film, filtering errors caused by foreign objects such as water and ketchup or external impacts or vibration and by compensating for the disadvantages entailed by piezo types and impedance types, respectively, even if a metal plate is thick or the clearance is narrow between touch keys.

The present invention provides, by exactly recognizing the detouching time as a touch screen does, a touch pad using the piezo effect that stably recognizes various touch patterns a user executes such as long key and multi key.

In addition, the present invention provides a touch pad using the piezo effect that affords a user the advantage to specify his or her own, secret security key that is not to be duplicated for other users and significantly increases the level of security because the present invention combines long key inputs and multi key inputs then converts the inputs to various key values according to the location as well as pressing pattern.

Moreover, the present invention provides a touch pad using the piezo effect that is applied especially to a metal plate and, still utilizing a piezo film, as a touch screen does, stably recognizes various slide touch patterns a user executes such as drag, wheel slide, zoom-in, zoom-out by extracting in the form of coordinates the change in impedance by channel (or the interference between adjacent channels) and exactly recognizing the detouching time.

Furthermore, the present invention provides a touch pad using the piezo effect that, still utilizing a piezo film, is applied to metal, etc., is fabricated considerably thin in ultraslim smartphones, etc., and stably and sensitively recognizes the output level of touch keys.

To achieve the objectives, the present invention provides a touch pad using the piezo effect comprising: a touch pad equipped with touch keys; a piezo film that attaches to the bottom surface of the touch pad and radiates ultrasonic waves; and a control section that recognizes touches a user executes by analyzing the electric displacement of the piezo film and ultrasonic impedance reflected by the touch pad surface and a touch object that contacts to the surface.

The touch pad using the piezo effect according to the present invention additionally comprises a base plate that supports the touch pad and piezo film and contains a marginal gap so that the touch pad as well as the piezo film flexurally deform at the time of a touch key input.

The base plate affords a separate marginal gap for each touch key at the time of a touch key input.

The control section recognizes a touch key as a touch a user executes only if an electric displacement of the piezo film is detected under the touch key at the time of the touch key input and an ultrasonic wave is reflected by a touch object, on the touch key, that contacts to the touch pad.

Alternatively, the base plate affords, at the time of a touch key input, a marginal gap that continuously extends over a group of touch keys.

The control section recognizes, among a group of touch keys over which the control section detects the electric displacement of the piezo film at the time of a touch key input, only a touch key for which an ultrasonic wave is reflected by a touch object that contacts to the touch pad surface as a touch a user executes.

According to an embodiment of the present invention, the control section recognizes a touch key as a long key input a user executes if the touch key has been recognized as a touch input a user executed then the ultrasonic impedance change of the touch key has been returned after being maintained for a certain period.

In addition, the control section recognizes a touch key as a multi key input a user executes if the touch key has been recognized as a touch input a user executed then, while the impedance change of the touch key is maintained, another touch key is input.

The touch pad using the piezo effect according to the present invention additionally comprises a memory device that stores a security key of a user that is input via the touch pad, wherein the control section controls the security key by analyzing the electric displacement of the piezo film and ultrasonic impedance reflected by the touch pad surface and a touch object that contacts to the surface while the security key includes a long key input a user executes.

The security key includes a multi key input a user executes and the control section recognizes a touch key as a multi key input a user executes if the touch key has been recognized as a touch input a user executed then, while the impedance change of the touch key is maintained, another touch key is input.

The security key is formed by combining long key inputs and multi key inputs a user executes.

The security key includes a knock key that converts the touch pad to standby mode.

Another embodiment of the present invention provides a touch pad using the piezo effect comprising: a touch pad equipped with touch keys; a piezo film that attaches to the bottom surface of the touch pad, is equipped with multidirectional sensor channels and radiates ultrasonic waves; and a control section recognizes touches a user executes by analyzing the electric displacement of the piezo film and ultrasonic impedance reflected by the touch pad surface and a touch object that contacts to the surface, wherein the control section extracts the position coordinates of the touch object according to the impedance change in each of the sensor channels and recognizes the coordinates as a slide touch gesture input a user executes.

The control section recognizes a touch object that has been recognized as a touch input a user executed then is scrolled in a certain direction as a drag touch gesture input a user executes.

The control section recognizes a drag touch gesture input that is executed simultaneously when another drag touch gesture is input as a zoom-in touch or zoom-out touch gesture input.

The control section recognizes, in a drag touch gesture input, a touch object that is detouched within a certain period as a wheel slide touch gesture input a user executes.

The control section recognizes a touch object as a detouch if the touch object has been recognized as a touch input a user executed then the ultrasonic impedance change of the touch key has been returned.

Yet another embodiment of the present invention provides a touch pad using the piezo effect comprising: a touch pad that is equipped with touch keys and notches that protrudes from the bottom surface of the touch pad; a piezo film that is arrayed underneath the touch pad with a clearance in between; a base plate that supports the piezo film and contains a marginal gap so that the piezo film flexurally deforms by the notches at the time of a touch key input; and a control section that recognizes a touch a user executes by analyzing the electric displacement of the piezo film.

The piezo film radiates ultrasonic waves while the control section recognizes a touch a user executes by analyzing the ultrasonic waves reflected by the touch pad surface and a touch object.

The control section recognizes a touch key as a touch a user executes only if an electric displacement of the piezo film is detected under the touch key at the time of the touch key input and an ultrasonic wave is reflected by a touch object, on the touch key, that contacts to the touch pad.

A touch pad using the piezo effect provided by the present invention has advantageous effects as follows:

First, although the touch pad still utilizes a piezo film, it exactly determines whether a touch is done by a user by filtering errors caused by foreign objects such as water and ketchup or external impacts or vibration;

Second, even with a touch pad that is thick or with touch keys the clearance between them are narrow, it exactly recognizes a touch a user executes by compensating for the disadvantages entailed by piezo types and impedance types, respectively, especially by completely resolving the drawbacks intrinsic to piezo types;

Third, it exactly and stably recognizes various touch patterns such as long key, multi key and wheel slide touch a user executes on such a material as metal plate by compensating, with an impedance type feature that detects the change in and return of impedance, for the drawbacks intrinsic to piezo types in that may not recognize the output level at the time of a detouch;

Fourth, as a touch screen does, it combines long key inputs and multi key inputs then converts the results to various key values according to the position and pressing patterns, which lets a user set up his or her own security key that is not to be duplicated for other users and significantly increases the degree of security;

Fifth, although it still utilizes the piezo effect, it can be achieved especially on metal and stably recognizes a slide touch pattern a user executes by employing the feature of impedance types so that it extracts the change in coordinates of a touch object according to the impedance change of each channel of the sensor channels (patterns); and Sixth, it is easily achieved on metal and fabricated considerably thin, and recognizes stably and sensitively the output level of touch keys because the notches on the touch pad bottom surface and the piezo film arrayed in the upper part of the base plate recognize the touches.

DETAILED DESCRIPTION

Preferred embodiments that may specifically achieve the objectives of the present invention will now be described in detail with reference to accompanying drawings. An identical subject matter is designated by a correspondingly identical term and identical reference numeral and any further description pertinent to it will not be provided.

Figure 1:
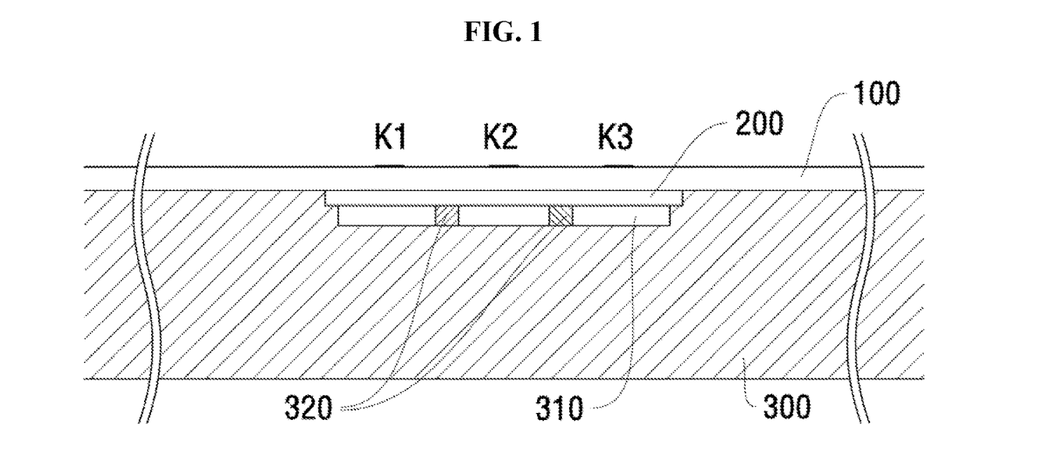
FIG. 1 is a cross-sectional view of a touch pad using the piezo effect according to the present invention.
Figure 2:
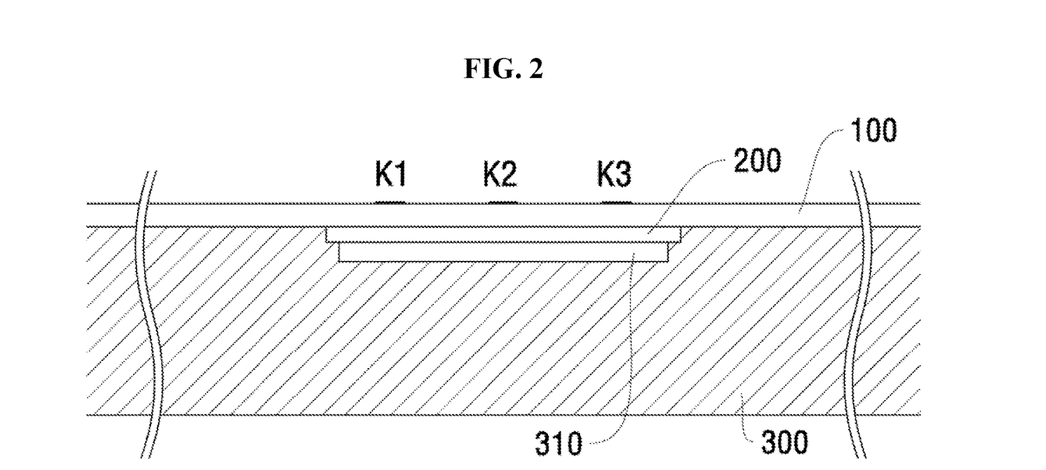
FIGS. 2 and 3, respectively, is a cross-sectional view of a touch pad using the piezo effect according to an embodiment of the present invention.
Figure 3:
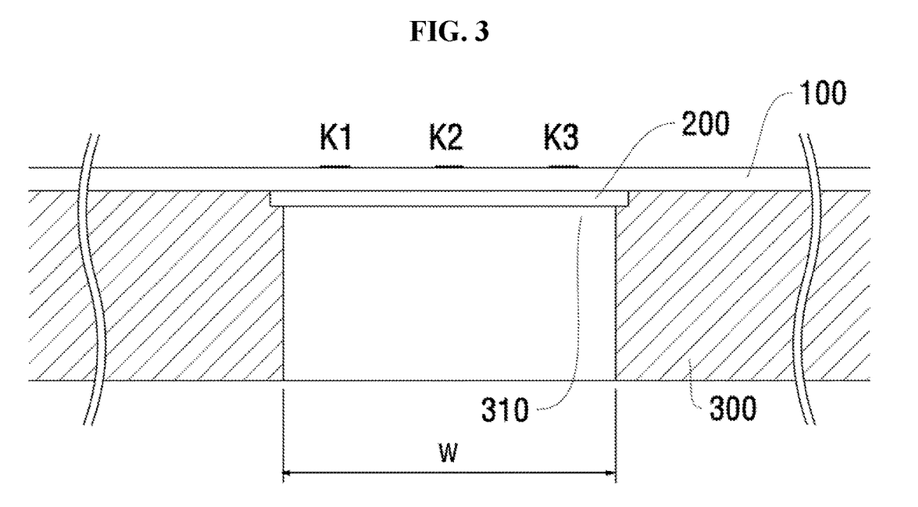

FIG. 1 is a cross-sectional view of a touch pad using the piezo effect according to the present invention and FIGS. 2 and 3, respectively, is a cross-sectional view of a touch pad using the piezo effect according to an embodiment of the present invention.

A touch pad using the piezo effect according to the present invention comprises, as illustrated in FIG. 1, a touch pad 100, a piezo film 200 and a control section (not illustrated in accompanying drawings).

The touch pad 100 is equipped with a plurality of touch keys K1; K2; and K3 while the material for the touch pad 100 may be required to be metal, but not limited thereto, and may include the general materials for touch panels including alloys, aluminum, other advanced materials, glass, etc.

The piezo film 200 is arrayed beneath the bottom surface of the touch pad 100 and, according to electric signal inputs, radiates ultrasonic pulses to the surface of the touch pad 100.

The piezo film 200 converts mechanical energy applied to the piezo film 200 to electric energy and vice versa, wherein electric energy is generated when the piezo film 200 deforms by external, physical force and, reversibly, the piezo film 200 deforms according to electric energy.

The ultrasonic pulses radiated from the piezo film 200 reach the surface of the touch pad 100, from which part of the ultrasonic pulses, containing information on the surface and the ultrasonic impedance of an arbitrary touch object that contacts to the surface, are reflected downward again.

The term of piezo film 200 signifies a piezo film part that includes the piezo film and may denote a concept that includes, not being simply the piezo film per se, an electrode (not illustrated in accompanying drawings), etc. that is electrically connected to an FPCB (flexible printed circuit board) to transmit (and receive) the ultrasonic waves.

The piezo film 200 may be required to assume the shape of thin film, but not limited thereto, and may include a ceramic element, etc. that has a certain thickness and exhibits the piezoelectric effect.

In addition, the present invention may additionally provides a base plate 300 that, in the lower part of the touch pad 100, supports the touch pad 100 as well as the piezo film 200, wherein the base plate 300 contains a marginal gap that is generated by a height difference toward which the touch pad 100 and the piezo film 200 flexurally deform at the time of a touch key input a user executes.

According to an embodiment of the present invention, at the time of a touch key input, a separate marginal gap 310 is formed for each touch key (hereinafter referred to as "Separate Type") in the marginal gap 310, for which spacers 320 are configured in the marginal gap 310 to divide the marginal gap 310 for each touch key.

The Separate Type may be required to be applied to a thin touch pad 100 the thickness of which is 0.40 mm or less so that each touch key is individually recognized even if the clearance between the touch keys is narrow by acquiring an adequate amount of output level generated by the flexure (distortion) of the piezo film 200.

However, each touch key may not be individually recognized because an adequate amount of output level is not acquired by the flexure (distortion) of the piezo film 200 if the touch pad 100 is 0.45 mm thick or more or the clearance between the touch keys is very narrow.

Another embodiment of the present invention provides, in order to resolve the problem, as illustrated in FIG. 2, the base plate 300 containing a continuous marginal gap 310 that extends without any obstruction over a group of touch keys K1; K2; and K3 that constitute a group (hereinafter referred to as "Continuous Type") at the time of a touch key input a user executes.

As illustrated in FIG. 2, a spacer, as introduced in the Separate Type, is not required to divide the space for each touch key in the marginal gap of the base plate 100 underneath the touch pad 100 that is equipped with a group of touch keys.

A group of three touch keys are exemplified in FIG. 2 as an embodiment of the present invention, whereas two, or four or more, as necessary, touch keys may constitute a group.

As illustrated in FIG. 3, the marginal gap 310 in a further embodiment of the present invention penetrates the base plate 300 so that the touch pad 100 and the piezo film 200 are distorted further sensitively.

Here, the width (W) of the marginal gap 310 may be required to increase or decrease proportionally to the thickness of the touch pad 100.

The control section (not illustrated in accompanying drawings) recognizes a touch a user executes by analyzing the electric displacement of the piezo film 200 and ultrasonic waves reflected by the touch pad 100 surface and a touch object such as finger and touch pen that contacts to the surface.

In other words, the control section detects the electric displacement of the piezo film 200 in order to exactly and stably recognize a touch a user executes and filter touch errors (hereinafter, a piezoelectric mode detector is referred to as "Piezo Type") and analyzes the ultrasonic waves that are reflected by various touch objects (hereinafter, an ultrasonic mode detector is referred to as "Impedance Type").

Here, an additional ultrasonic wave receiver such as hydrophone array (not illustrated in accompanying drawings) may be configured in order to detect, via the Impedance Type, the ultrasonic waves reflected by the touch pad 100 surface and a touch object that contacts to the surface.

As described, the touch pad using the piezo effect according to the present invention recognizes a touch a user executes by combining the touch recognition techniques of a Piezo Type and an Impedance Type.

More specifically, in case of a Separate Type that is equipped with a separate marginal gap 310 for each touch key, the control section recognizes a touch key as a touch a user executes only if, at the time of a touch key input, an electric displacement of the piezo film 200 (Piezo Type) under the touch key is detected and an ultrasonic wave is reflected by a touch object, on the touch key, that contacts to the touch pad 100 surface.

On the basis of such a double-touch recognition, in the technology the present invention provides, the Impedance Type compensates for the misrecognition caused by external impacts, vibration, etc. as a disadvantageous effect intrinsic to the Impedance Type and the Piezo Type compensates for the misrecognition caused by foreign objects such as water, ketchup, etc. as a disadvantageous effect intrinsic to the Impedance Type, which affords exact and stable recognition of a touch a user executes.

The order of the touch recognition processes by the Piezo Type and the Impedance Type does not matter and any one recognition process may proceed first or the both processes can be simultaneously implemented.

Meanwhile, in case of a Continuous Type that is equipped with a continuous marginal gap 310 that extends over a plurality of touch keys, the control section recognizes, among a group of touch keys over which the control section detects an electric displacement of the piezo film 200 (Piezo Type) at the time of a touch key input (or the control section determines that it is a touch key input), only a touch key for which an ultrasonic wave is reflected (Impedance Type) by a touch object that contacts to the touch pad 100 surface as a touch a user executes.

The order of the touch recognition processes by the Piezo Type and the Impedance Type does not matter also in such a Continuous Type. In other words, at the time of a touch key input, the control section recognizes, among those touch keys on which an ultrasonic wave is reflected (Impedance Type) by a touch object that contacts to the touch pad 100, only a touch key that belongs to the group of touch keys under which an electric displacement of the piezo film 200 is detected (Piezo Type) as a touch a user executes.

In this way, exact and stable recognition of a touch executed by a user is guaranteed even when the touch pad 100 is 0.45 mm thick or more or the clearance between the touch keys is very narrow by compensating for the disadvantages intrinsic to a Piezo Type and Impedance Type, respectively by detecting the output level of each group generated by the flexure (distortion) of the piezo film 200 in the touch recognition of the Continuous Type and analyzing the value of a reflected ultrasonic wave.

Accordingly, the touch pad using the piezo effect according to the present invention resolves to a significant extent the problem of the thickness of the touch pad and the clearance between the touch keys and may be extensively applied to user touch menus for appliances and touch technology in various industries such as automobile that widely use metal.

Figure 4:
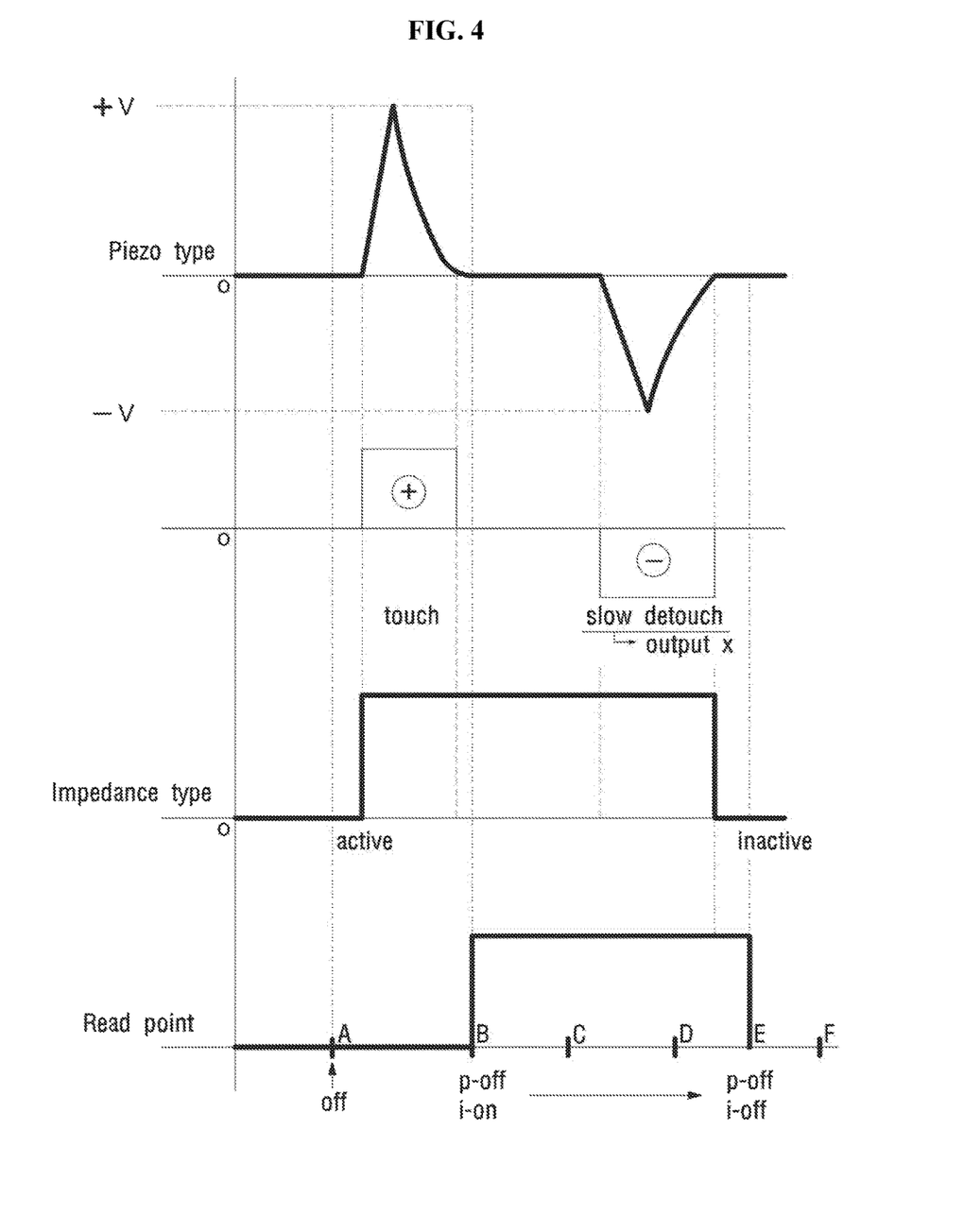
FIG. 4 is a diagram that plots the output levels, according to the touch key inputs, of a touch pad using the piezo effect according to an embodiment of the present invention.

FIG. 4 is a diagram that plots the output levels, according to the touch key inputs, of a touch pad using the piezo effect according to an embodiment of the present invention.

The piezo film 200 of the touch pad using the piezo effect according to an embodiment of the present invention is arrayed beneath the bottom surface of the touch pad 100 and radiates ultrasonic pulses to the touch pad 100 surface according to electrical signal inputs.

The ultrasonic pulses radiated from the piezo film 200 reach the surface of the touch pad 100, from which part of the ultrasonic pulses, containing information on the surface and the ultrasonic impedance of an arbitrary touch object that contacts to the surface, are reflected downward again.

The control section (not illustrated in accompanying drawings) recognizes a touch a user executes by analyzing the electric displacement (V) of the piezo film 200 and ultrasonic waves reflected by the touch pad 100 surface and a touch object such as finger and touch pen that contacts to the surface.

For information, a long key input that will be described signifies a state of a key input is active (or maintained) for a predetermined period or more after the key was input and a multi key input signifies a state in which a user inputs and maintains two or more touch keys simultaneously.

A multi key input includes a state in which one or more touch keys are additionally input (including a long key and a multi key) to a state in which a long key or a multi key of other one or more touch keys has been input then thus maintained.

In case that the Piezo Type recognizes a touch, the output level of the inverse electric displacement (−V) of the piezo film 200, which is required for determining whether a touch input is a long key input, is not generated appropriately when the touch pad 100 is a thick metal plate or a user slowly detouches a touch object from a touch key. (Refer to the output level plotted for Piezo Type as illustrated in FIG. 4)

Therefore, to resolve such a problem of long key input recognition intrinsic to the Piezo Type, the control section may be configured to recognize, after recognizing a touch key input by a user, taking into account the Impedance Type, a touch key as a long key input a user executes if the change in the ultrasonic impedance of the touch key is maintained active so that the touch key thus input can be recognized as a long key then the impedance is returned to the original or predetermined value. (Refer to the output level plotted for Impedance Type as illustrated in FIG. 4) In other words, as can be seen by the output levels at read points A to F illustrated in FIG. 4, the problem that the Piezo Type fails to appropriately recognizes a detouch is compensated for by the Impedance Type, which enables a long key input to be exactly determined. (A: p-off, i-on, B, C and D: p-off, i-on, E and F: p-off, i-off (p: piezo output, i: impedance output))

Here, the control section may be configured to recognize any two touch keys as a multi key input a user executes if, after a touch key is recognized as a touch input of a user, taking into the Impedance Type, another touch key is input to a state in which the change in the ultrasonic impedance of the former key is active (or a state in which the touch input is not detouched).

As thus far described, the touch pad using the piezo effect according to the present invention recognizes a long key touch input and a multi key touch input a user executes by combining the touch recognition processes of the Piezo Type and the Impedance Type.

In other words, a touch input is recognized mainly by a Piezo Type while a detouch is recognized by an Impedance Type, wherein, even in recognizing a touch input, only the Impedance Type can be used per se or the Impedance Type may be used to compensate for the disadvantage of the Piezo Type.

Accordingly, based on the double-touch recognition technique, a Piezo Type may be applied to a touch pad made of metal or other advanced materials to resolve the problem of non-output of an inverse electric displacement (−V) of the piezo film 200 that occurs when a user detouches a touch object very slowly from a touch key.

Thus, an Impedance Type can exactly determine which touch key input is active (or maintained) and when a detouch occurs, which again determines a long key input of a touch key.

In addition, a state of simultaneous inputs (or being maintained) of two or more touch keys is recognized with ease as a multi key because the Impedance Type recognizes a state in which a touch key input is maintained.

In short, a touch pad using the piezo effect according to the present invention exactly recognizes a long key and a multi key by compensating, with an Impedance Type, for the detouching time verification (or long key recognition) problem that occurs when metal or other advanced materials as a Piezo Type are applied to a touch pad.

Accordingly, the present invention may be extensively applied to user touch menus for appliances made of metal, digital doorlocks that require security keys and various industries such as automobile that widely use metal.

Meanwhile, a still another embodiment of the present invention may additionally comprises a memory device (not illustrated in accompanying drawings) to store a security key of a user that is input via the touch pad 100, wherein the security key may be stored as the position, order, various key patterns, such as long key input and multi key input that will be described below, the user inputs and combination thereof.

The security key includes various authentification keys that require security such as knock key or wake up key or unlock key that converts the state of the touch pad of a smart device such as smartphone to standby state, user authentification to proceed with a specific process such as smartphone banking.

Here, the control section (not illustrated in accompanying drawings) recognizes a touch a user executes and controls the security key by detecting the electric displacement (V) of the piezo film 200 and analyzing the ultrasonic impedance reflected by the touch pad 100 surface and a touch object such as finger and touch pen that contacts to the surface.

For this purpose, the control section determines whether a user has been authentified by preliminarily receiving a security key the user inputs and registering the security key then comparing the key value the user has input with the security key stored in the memory device.

A further embodiment of the present invention provides a touch pad 100 that is made of a metal plate and embedded in a doorlock that is visually integrated into a piece with a door made also of metal, wherein the door and doorlock are to be visually separated from each other by lighting, etc. waiting key inputs only after knock key inputs, which may be applied to various security devices in real life.

Accordingly, a touch pad using the piezo effect according to the present invention exactly recognizes a long key and a multi key by compensating, with an Impedance Type, for the detouching time verification (or long key recognition) problem that occurs when metal or other advanced materials as a Piezo Type are applied to a touch pad, which may diversify the security keys according to users and increase the security level thereof.

In other words, although a Piezo Type is employed, a touch pad according to the present invention combines, as a touch screen does, long key inputs and multi key inputs then converts the results to various key values according to the position and pressing patterns, which lets a user set up his or her own security key that is not to be duplicated for other users and significantly increases the degree of security.

In short, the present invention may be extensively applied to the knock key and unlock key of various smart devices such as smartphone, touch menus for smart banking, digital doorlocks and even to the touch security technology in various industries such as automobile that widely use metal.

Figure 5:
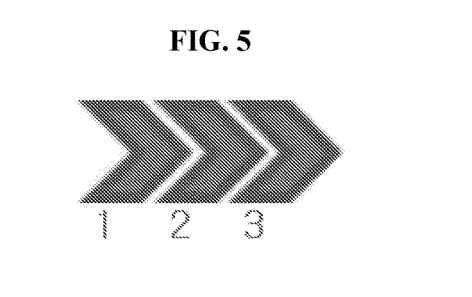
FIG. 5 is a diagram that describes an embodiment of key patterns of a touch pad using the piezo effect according to an embodiment of the present invention.

FIG. 5 is a diagram that describes an embodiment of key patterns of a touch pad using the piezo effect according to an embodiment of the present invention.

A touch pad using the piezo effect according to another embodiment of the present invention is equipped with a piezo film 200 that is arrayed beneath the bottom surface of the touch pad 100, equipped with multidirectional sensor channels (or patterns) constructed via application, etc. and radiates to the surface of the touch pad 100 an ultrasonic pulse according to an electric signal input.

For information, a slide touch gesture input, which will be described below, signifies an inclusive concept that transports a touch object with the touch pad 100 screen maintained touched.

A drag touch gesture input among the slide touch gesture inputs signifies a scrolling motion in a certain direction with the touch pad 100 screen maintained touched.

A zoom-in touch gesture input, sometimes named a pinch open, among the slide touch gesture inputs signifies a motion that splays two fingers that still remain touched to the touch screen as though they outstretch the screen.

A zoom-out touch gesture input, sometimes named a pinch close, as the opposed motion to the zoom-in touch gesture input, signifies a motion that puts together two fingers that still remain touched to the touch screen as though they shrink the screen.

A wheel slide touch gesture input, sometimes named a flic, signifies a motion that is also the drag touch but detouches the touch object from the touch screen within a short period. This input is used when, for example, a user scrolls rapidly up and down the screen on an interface element with scrolling available.

Moreover, in order for Impedance Type to compensate for the disadvantage of the Piezo Type, the control section extracts the position coordinates of a touch object according to the impedance change of each channel (or interference between adjacent channels) of the multidirectional sensor channels (or patterns) and recognizes the coordinates as a slide touch gesture input a user executes.

Although a touch pad in the existing electrostatic capacity mode generates movement information on touch points by extracting position coordinates according to the "electrostatic capacity change of each channel" of a sensor channels (or patterns) that are multidirectionally arrayed, the present invention extracts the position coordinates according to the "impedance change of each channel".

For example, as illustrated in FIG. 5, in case that sensor key patterns are composed of a piezo film, when a touch is input via pattern (or channel) #1, because the impedance change is the largest in pattern #1 while part of the impedance change is detected in pattern (or channel) #2, the control section recognizes that a touch object moves in a drag or slide mode.

More specifically, the control section recognizes a touch object that has been recognized as a touch input a user executed then is scrolled in a certain direction as a drag touch gesture input a user executes by extracting the position coordinates (or movement) of the touch object according to the impedance change of each channel (or interference between adjacent channels) of the multidirectional sensor channels (or patterns).

In addition, the control section recognizes a touch object that has been recognized as a touch input a user executed as a zoom-in touch or a zoom-out touch gesture input, by extracting the position coordinates (or movement) of the touch object according to the impedance change of each channel (or interference between adjacent channels) of the multidirectional sensor channels (or patterns), if a drag touch gesture input is simultaneously implemented when another drag touch gesture input is maintained.

As described, a zoom-in touch gesture input signifies a motion that outstretches two drag touch gestures while a zoom-out touch gesture input signifies a motion that puts together two drag touch gestures.

In case that the Piezo Type recognizes a touch, the output level of the inverse electric displacement (−V) of the piezo film 200 is not generated appropriately when the touch pad 100 is a thick metal plate or a user slowly detouches a touch object from a touch key. (Refer to the output level plotted for Piezo Type as illustrated in FIG. 4)

Therefore, to resolve such a problem of detouch recognition intrinsic to the Piezo Type, the control section recognizes, taking into account the Impedance Type, a touch (or object) as a detouch executed by a user if the change in the ultrasonic impedance of the touch is returned to the original or predetermined impedance value after the ultrasonic impedance of the touch thus input changes. (Refer to the output level plotted for Impedance Type as illustrated in FIG. 4)

Via such a technique, upon inputting a drag touch gesture, the control section may be configured to recognize a touch object that is detouched (or the impedance value of which is returned) within a certain period (or a predetermined short period) as a wheel slide touch gesture input executed by a user.

In other words, as can be seen by the output levels at read points A to F illustrated in FIG. 4, the problem that the Piezo Type fails to appropriately recognizes a detouch is compensated for by the Impedance Type, which enables a wheel slide touch gesture input to be exactly determined. (A: p-off, i-on, B, C and D: p-off, i-on, E and F: p-off, i-off (p: piezo output, i: impedance output))

In short, to complement a Piezo Type, a touch pad using the piezo effect according to the present invention combines the touch recognition processes of the Piezo Type and the Impedance Type for being applied, especially, to metal and recognizes a slide touch gesture input executed by a user by extracting the position coordinates movement of a touch object according to the impedance change of each channel of the sensor channels.

In other words, a touch input is recognized mainly by a Piezo Type while a detouch and movement is recognized by an Impedance Type, wherein, even in recognizing a touch input, only the Impedance Type can be used per se or the Impedance Type may be used to compensate for the disadvantage of the Piezo Type.

Accordingly, based on the double-touch recognition technique, a Piezo Type may be applied to a touch pad made of metal, alloys, aluminum or other advanced materials to resolve the problem of non-output of an inverse electric displacement (−V) of the piezo film 200 that occurs when a user detouches a touch object very slowly from a touch key.

Thus, an Impedance Type can exactly determine which touch key is detouched and when the detouch occurs, which stably determines a wheel slide touch gesture.

In addition, because the Impedance Type can recognize a state that a drag touch gesture is maintained, the Impedance Type also can recognize a zoom-in or zoom-out touch gesture input by comparing the state with another state that another drag touch gesture is simultaneously maintained.

In short, a touch pad using the piezo effect according to this embodiment exactly recognizes a drag touch gesture and a wheel slide touch input by compensating, with an Impedance Type, for the touch movement and detouching time verification problem that occurs when metal or other advanced materials as a Piezo Type are applied to a touch pad.

A piezo film 200 that is equipped with sensor channels is arrayed on a touch pad 100 according to another embodiment of the present invention that is made of a metal plate in the rear surface of a smartphone, wherein, if inputting a knock key that knocks the rear surface of the smartphone by a certain number of times, for example, two or three times, in order to convert the touch pad to the standby state, the front screen of the smartphone is controlled by means of touches on the touch pad 100 mounted in the rear surface of the smartphone.

Such technology according to this embodiment can control, in the middle of driving a car, a smartphone screen by inputting a knock key that knocks two or three consecutive times the rear surface of the smartphone with a hand that does not grip the steering wheel, then can the smartphone via up-and-down and/or right-and-left jog & shuttle technique, etc., by inputting a slide touch gesture.

In this embodiment, it may be required that the knock key input to convert the touch pad 100 to the standby state should be recognized by the control section via a Piezo Type.

The multidirectional sensor channels (or patterns) according to the present invention may be arbitrarily arrayed and pose any well-known shape, as long as the geometry extracts with ease the position coordinates movement of a touch object according to the impedance change of each sensor channel of the sensor channels via the interference between adjacent channels (or patterns), including simple rectangular lattice, diamond, circle, eclipse, ellipse, arch, etc.

Therefore, the present invention may be extensively applied to user touch menus using touch gestures for various appliances that are made of metal including the haptic technology, any field that requires security keys and the touch technology in various industries including automobile that widely use metal.

Figure 6:
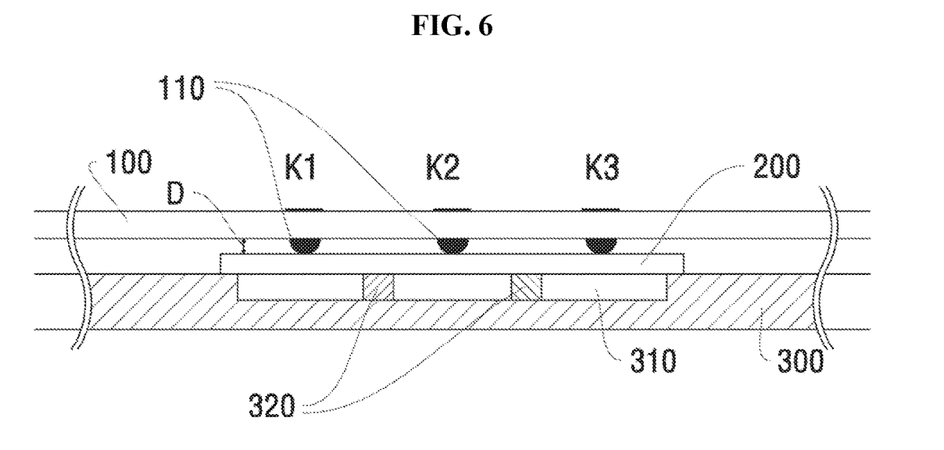
FIGS. 6 and 7, respectively, is a cross-sectional view of a touch pad using the piezo effect according to an embodiment of the present invention.
Figure 7:
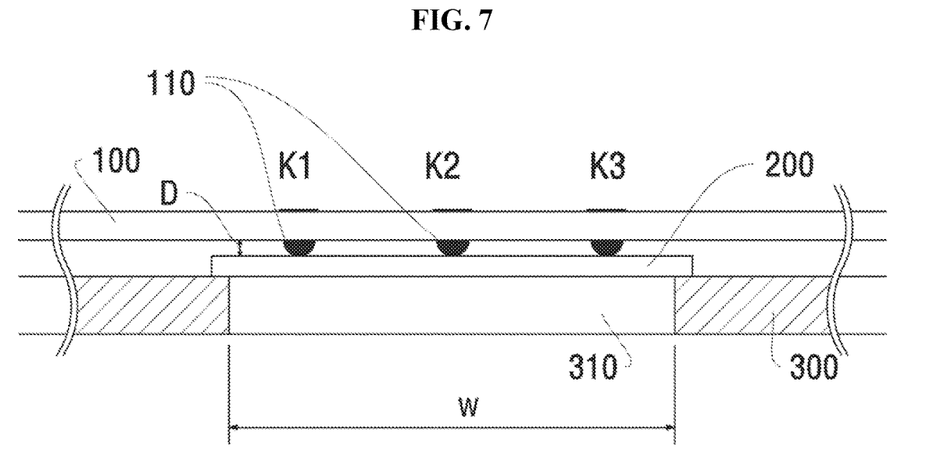

FIGS. 6 and 7, respectively, is a cross-sectional view of a touch pad using the piezo effect according to an embodiment of the present invention.

To achieve a touch pad 100 according to this embodiment, notches 110 protrude from the bottom surface of the touch pad 100 to press a piezo film 200 and make the piezo film generate an electric displacement and a notch 110 protrudes from a location that corresponds to each of the touch keys K1; K2; and K3.

Each of the notches 110 may be required to assume the shape of a rough hemisphere that protrudes downward from the touch pad 100 bottom surface, but not limited thereto, and may assume various shapes including cylinder, polygon, etc.

The piezo film 200 is arrayed beneath the touch pad 100 with a clearance in between while the distance between the piezo film 200 and the touch pad 100, D, is about a few micrometers that is sufficient if the lower end of the notches 110 contact to the top of the piezo film 200.

A base plate 300 supports the piezo film 200 from beneath and contains a marginal gap 310 across which, at the time a user inputs a touch key, the notches 110 of the touch pad 100 press and deform down the piezo film 200.

As illustrated in FIG. 6 for an embodiment of the present invention, the base plate 300 may contain separate marginal gaps 310 each of which is allocated to each touch key at the time of a touch key input, for which spacers 320 are formed to divide the space for each touch key in the marginal gap 310 with a clearance in between.

A control section (not illustrated in accompanying drawings) recognizes a touch executed by a user by analyzing an electric displacement of the piezo film 200 generated by the deformation of the touch pad 100.

As illustrated in FIG. 7 for another embodiment of the present invention, the marginal gap 310 may penetrate the base plate 300 so that the piezo film 200 is distorted further sensitively by the notches 110 of the touch pad 100.

Here, the width (W) of the marginal gap 310 may be required to increase or decrease proportionally to the thickness of the touch pad 100 while, as illustrated in FIG. 6 for this embodiment, at the time of a touch key input, a separate marginal gap 310 may be formed for each touch key.

The touch pad using the piezo effect provided by the present invention is easily achieved on metal and fabricated considerably thin, and recognizes stably and sensitively the output level of touch keys because the touch pad uses for recognizing a touch the notches 110 on the bottom surface of the touch pad 100 and the piezo film 200 arrayed on the top of the base plate 300.

In addition, as described as an embodiment of the present invention, the touch pad recognizes a touch executed by a user by combining the touch recognition processes of a Piezo Type and Impedance Type.

More specifically, the control section recognizes a touch key as a touch a user executes only if, at the time of a touch key input, an electric displacement of the piezo film 200 (Piezo Type) under the touch key is detected and an ultrasonic wave is reflected by a touch object, on the touch key, that contacts to the touch pad 100 surface.

On the basis of such a double-touch recognition, in the technology the present invention provides, the Impedance Type compensates for the misrecognition caused by external impacts, vibration, etc. as a disadvantageous effect intrinsic to the Impedance Type and the Piezo Type compensates for the misrecognition caused by foreign objects such as water, ketchup, etc. as a disadvantageous effect intrinsic to the Impedance Type, which affords exact and stable recognition of a touch a user executes.

Thus, the touch pad using the piezo effect provided by the present invention resolves to a significant extent the problems of application of a piezo film to metal and thickness (or slimness) of a touch pad and may be applied to touch menus for various ultraslim, portable devices, other appliances and the touch technology of various industries that widely use metal.

Preferred embodiments has thus far described according to the present invention but it is clear to a person skilled in the art that the present invention may be achieved to other specific variations without compromising the objects and scope thereof.

Therefore, the embodiments thus far disclosed must be considered explicative, not definitive and, accordingly, the present invention must not limited to the description thus far disclosed but may be modified within the scope of the Claims and equivalents thereof.

What is claimed is:

1. A touch pad using the piezo effect comprising:
   a touch pad equipped with touch keys;
   a piezo film that attaches to the bottom surface of the touch pad and radiates ultrasonic waves; and
   a control section that recognizes touches a user executes by analyzing the electric displacement of the piezo film and ultrasonic impedance reflected by the touch pad surface and a touch object that contacts to the surface.

2. The touch pad using the piezo effect of claim 1 additionally comprising a base plate that supports the touch pad and piezo film and contains a marginal gap so that the touch pad as well as the piezo film flexurally deform at the time of a touch key input.

3. The touch pad using the piezo effect of claim 2, wherein the base plate affords a separate marginal gap for each touch key at the time of a touch key input.

4. The touch pad using the piezo effect of claim 3, wherein the control section recognizes a touch key as a touch a user executes only if an electric displacement of the piezo film is detected under the touch key at the time of the touch key input and an ultrasonic wave is reflected by a touch object, on the touch key, that contacts to the touch pad.

5. The touch pad using the piezo effect of claim 2, the base plate affords, at the time of a touch key input, a marginal gap that continuously extends over a group of touch keys.

6. The touch pad using the piezo effect of claim 5, the control section recognizes, among a group of touch keys over which the control section detects the electric displacement of the piezo film at the time of a touch key input, only a touch key for which an ultrasonic wave is reflected by a touch object that contacts to the touch pad surface as a touch a user executes.

7. The touch pad using the piezo effect of claim 1, wherein the control section recognizes a touch key as a long key input a user executes if the touch key has been recognized as a touch input a user executed then the ultrasonic impedance change of the touch key has been returned after being maintained for a certain period.

8. The touch pad using the piezo effect of claim 7, wherein the control section recognizes a touch key as a multi key input a user executes if the touch key has been recognized as a touch input a user executed then, while the impedance change of the touch key is maintained, another touch key is input.

9. The touch pad using the piezo effect of claim 7 additionally comprising a memory device that stores a security key of a user that is input via the touch pad, wherein the control section controls the security key by analyzing the electric displacement of the piezo film and ultrasonic impedance reflected by the touch pad surface and a touch object that contacts to the surface while the security key includes a long key input a user executes.

10. The touch pad using the piezo effect of claim 9, wherein the security key includes a multi key input a user executes and the control section recognizes a touch key as a multi key input a user executes if the touch key has been recognized as a touch input a user executed then, while the impedance change of the touch key is maintained, another touch key is input.

11. The touch pad using the piezo effect of claim 10, the security key is formed by combining long key inputs and multi key inputs a user executes.

12. The touch pad using the piezo effect of claim 11, wherein the security key includes a knock key that converts the touch pad to standby mode.

13. A touch pad using the piezo effect comprising:
   a touch pad equipped with touch keys;
   a piezo film that attaches to the bottom surface of the touch pad, is equipped with multidirectional sensor channels and radiates ultrasonic waves; and a control section recognizes touches a user executes by analyzing the electric displacement of the piezo film and ultrasonic impedance reflected by the touch pad surface and a touch object that contacts to the surface, wherein the control section extracts the position coordinates of the touch object according to the impedance change in each of the sensor channels and recognizes the coordinates as a slide touch gesture input a user executes.

14. The touch pad using the piezo effect of claim 13, wherein the control section recognizes a touch object that has been recognized as a touch input a user executed then is scrolled in a certain direction as a drag touch gesture input a user executes.

15. The touch pad using the piezo effect of claim 14, wherein the control section recognizes a drag touch gesture input that is executed simultaneously when another drag touch gesture is input as a zoom-in touch or zoom-out touch gesture input.

16. The touch pad using the piezo effect of claim 14, wherein the control section recognizes, in a drag touch gesture input, a touch object that is detouched within a certain period as a wheel slide touch gesture input a user executes.

17. The touch pad using the piezo effect of claim 16, wherein the control section recognizes a touch object as a detouch if the touch object has been recognized as a touch input a user executed then the ultrasonic impedance change of the touch key has been returned.

18. A touch pad using the piezo effect comprising:
a touch pad that is equipped with touch keys and notches that protrudes from the bottom surface of the touch pad;
a piezo film that is arrayed underneath the touch pad with a clearance in between;
a base plate that supports the piezo film and contains a marginal gap so that the piezo film flexurally deforms by the notches at the time of a touch key input; and
a control section that recognizes a touch a user executes by analyzing the electric displacement of the piezo film.

19. The touch pad using the piezo effect of claim 18, wherein the piezo film radiates ultrasonic waves while the control section recognizes a touch a user executes by analyzing the ultrasonic waves reflected by the touch pad surface and a touch object.

20. The touch pad using the piezo effect of claim 18, wherein the control section recognizes a touch key as a touch a user executes only if an electric displacement of the piezo film is detected under the touch key at the time of the touch key input and an ultrasonic wave is reflected by a touch object, on the touch key, that contacts to the touch pad.

* * * * *